United States Patent [19]
Sabatino

[11] Patent Number: 4,762,283
[45] Date of Patent: Aug. 9, 1988

[54] MACHINE AND METHOD FOR FORMING WINDINGS ON ELECTRIC MOTOR STATORS

[75] Inventor: Luciani Sabatino, Florence, Italy
[73] Assignee: Axis S.p.A., Florence, Italy
[21] Appl. No.: 88,020
[22] Filed: Aug. 18, 1987

Related U.S. Application Data

[63] Continuation of Ser. No. 785,918, Oct. 10, 1985, abandoned.

[30] Foreign Application Priority Data

Jul. 9, 1985 [IT] Italy ............................. 21485 A/85

[51] Int. Cl.$^4$ ......................................... H02K 15/085
[52] U.S. Cl. ................................. 242/1.1 R; 242/7.03
[58] Field of Search ............... 242/1.1 R, 1.1 E, 7.03; 29/732, 596; 74/22 R, 24

[56] References Cited

U.S. PATENT DOCUMENTS 2,304,520 12/1942 Wirtz et al. ..................... 242/1.1 R
2,579,585 12/1951 Klinksiek ........................ 242/1.1 R
3,411,725 11/1968 Biddison ......................... 242/101 R

FOREIGN PATENT DOCUMENTS 2514211 4/1983 France .
2068787 8/1981 United Kingdom .

Primary Examiner—Stuart S. Levy
Assistant Examiner—Joseph J. Hail, III
Attorney, Agent, or Firm—Eric C. Woglom; Robert R. Jackson

[57] ABSTRACT

A machine for forming windings on electric motor stators, comprising a needle driven with reciprocating rectilinear motion combined with reciprocating rotary motion about its axis. The needle has two opposing points, which are orthogonal to the needle. The needle carries copper wires unwinding from reels in order to deposit the wires in slots in a stator armature. The needle is split into two arms or ends oscillating between a position of substantial parallelism, in which the ends of the points are at a distance apart which is less than the maximum width of the inner cavity of the stator, and a position of maximum divergence in which the ends of the points are at a distance apart which exceeds the distance between the ends of the teeth which frontally retain the windings in the opposite slots of the stator. Linkages are connected to members which effect the reciprocating translational and rotary movements of the needle in order to determine the position of parallelism during the translation of the needle within the stator cavity, and to cause the arms or their ends to diverge when the needle is external to the stator during its rotation about the slots until it reaches the position of maximum divergence, and then to return it to its position of parallelism.

10 Claims, 2 Drawing Sheets

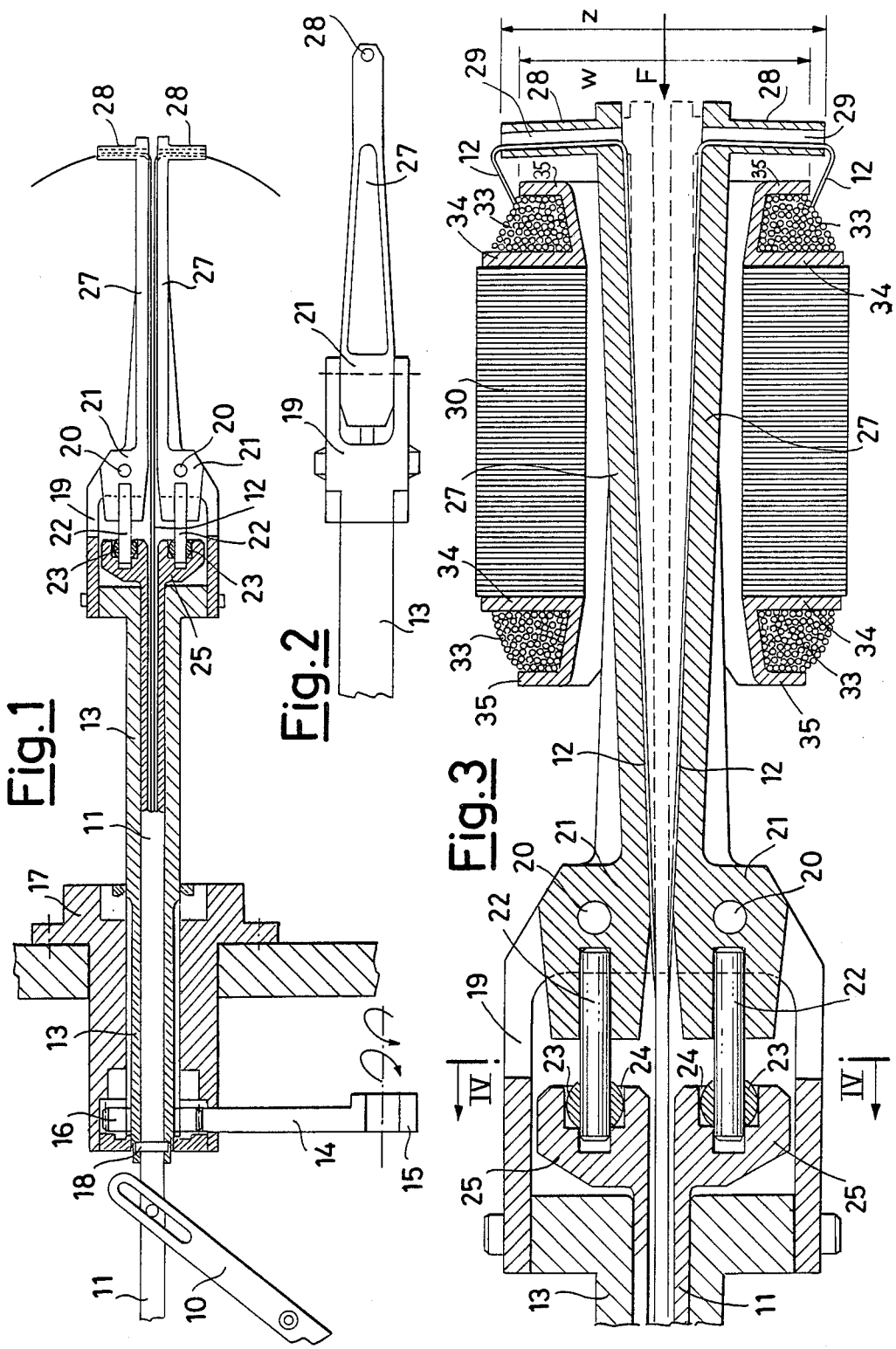

MACHINE AND METHOD FOR FORMING WINDINGS ON ELECTRIC MOTOR STATORS

This is a continuation of application Ser. No. 785,918 filed Oct. 10, 1985, now abandoned.

The invention relates to machines for forming windings on electric motor stators.

Machines for forming stator windings are known in which a needle, driven with rectilinear reciprocating motion combined with reciprocating rotary motion about its axis, carries at least one copper wire unwinding from a reel in order to deposit it in the stator armature slot. The needle comprises one pont if a single winding is to be made, or comprises two opposing points if both windings are to be made simultaneously. In all cases, the needle always has its axis of advancement and rotation coinciding with the stator axis in order to enable it to slide in the open spaces between the slots inside the stator during its to-and-fro movement and to lie equidistant from all the slots of the armature onto which its points are to wind the copper wire. Moreover, in the case of a stator with two opposing windings, winding forms, also known as shoes, are applied to the ends of the respective slots, and are shaped in such a manner as to accompany the copper wire of the needle into the slot, when the needle rotates external to the stator.

These shoes have a basic and specific purpose in that, as stated, the needle is coaxial to the stator axis and thus its point cannot pass beyond the winding retention tooth during its rotation which takes place beyond the inner diameter of the stator, so that if the shoe is not used the copperwire is unable to wind onto the slot beyond the retention tooth.

If the retention tooth does not exist, only a few turns could be deposited, and these would represent only a small percentage of those required.

In addition to the need to construct these shoes accurately, they must also be properly sized for each stator to be constructed, even though they represent an element which forms no part of the final product. In this respect, the shoes are removed by two devices when the winding has been formed.

In addition, four tensioning devices have to be set up to hold the shoes rigidly against the stator during the winding formation stage, and to enable them to be rapidly released from it when the winding is formed.

In order to enable the use of winding forms or shoes to be dispensed with together with their tensioning devices and the devices which release them from the stator, and in order to improve the winding which is formed about each slot by reducing the needle stroke and the loop which the wire makes external to the stator, by virtue of the elimination of the shoes, the applicant has proposed a method which forms the subject matter of U.S. Ser. No. 840,735 filed Mar. 18, 1986.

This application relates to a forming machine in which the needle axis is eccentric to the stator centre and lies at a distance therefrom, along the axis of symmetry of the slots to which it is adjacent, such that the height of the needle point, calculated as the distance between its end and the axis of symmetry of the slots, is equal to or greater than the distance between the slot axis and the end of the tooth which frontally retains the winding in the slots. However, this embodiment has the drawback of enabling only one winding to be formed on the stator at a time, unless the machine comprises two adjacent stations on which windings are formed on opposite slots. The object of the invention is to propose a forming machine in which two needles are provided in the conventioal manner for simultaneously forming the two windings, but in which said needles operate in such a manner as not to require the use of winding forms or shoes, or, consequently, their tensioning devices and the devices which release them from the stator.

These and further objects which will be more apparent hereinafter are atatined according to the invention by a machine for forming windings on electric motor stators, of the type comprising a needle driven with reciprocating rectilinear motion combined with reciprocating rotary motion about its axis, and which by way of its two opposing points, which are orthogonal to it, delivers copper wires unwinding from reels in order to deposit them in the slots of the stator armature, characterised in that the end points of the needle are split into separate entities and oscillate between a position of maximum mutual approach in which they are at a distance x apart which is less than the maximum width of the inner cavity of the stator, and a position of maximum divergence in which the ends of the points are at a distance z apart which exceeds the distance w between the ends of the teeth which frontally retain the windings in the opposite slots of the stator; there being provided linkages connected to the members which effect the reciprocating translational and rotary movements of the needle in order to determine said position of maximum mutual approach of the points during the translation of the needle within the stator cavity, and to cause the points to diverge when the needle is external to the stator during its rotation about the slots until it reaches said position of maximum divergence, and then to return it to the position of mutual approach.

A non-limiting embodiment of the invention is described hereinafter with reference to the accompanying drawings in which:

FIG. 1 is a partly sectional front view of the device according to the invention;

FIG. 2 is a side view of a detail of FIG. 1;

FIG. 3 is an enlarged view of a detail of FIG. 1 showing a section through a stator on which the winding is being formed;

Figure 4:
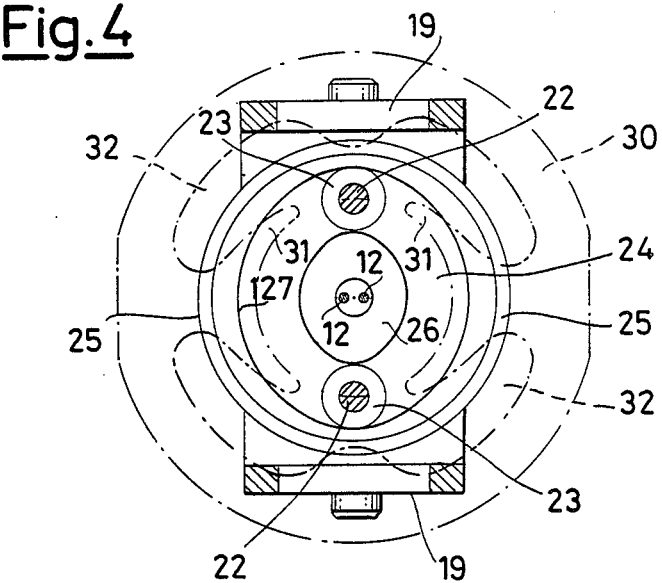
FIG. 4 is a section on the line IV—IV of FIG. 3 with the stator of FIG. 3 shown by dashed lines and rotated through 90°.

By means of a linkage, not shown, of the type for example described in Italian patent No. 1,167,995 granted on May 20, 1987 filed by the present applicant, a lever 10 causes a tube 11 to undergo reciprocating translational motion. The wires 12 which are to be wound about the stator slots pass through this tube.

The tube 11 is inserted into an outer tube 13 coaxial to the first, and is driven with reciprocating rotary motion about its axis by means of a toothed sector 14 pivoted at 15 and engaging a toothed wheel 16 keyed onto the tube 13. The tube 13 is inserted into a bush 17 within which it rotates and translates rigidly with the inner tube 11 to which it is translationally connected by means of the shoulder 18.

The outer tube 13 terminates with a fork 19 within which two levers 21 are provided at 20 (FIGS. 1, 2 and 3). At one end said levers 21 comprise cavities into which there are inserted pins 22 which are themselves inserted into balls 23 and into two grooves 24 in the end 25 of the inner tube 11. As can be seen from FIG. 4, the grooves 24 in reality form one continuous groove of elliptical extension. In this respect, as can be seen, the central part 26 of the end 25 of the tube 11 is of elliptical peripheral extension, and as the groove 24 must be of constant width as it contains balls 23, the outer wall 127 of the groove 24 must also be of elliptical extension equal to that of the central part 26, through which the the wires 12 slide.

At their other end, the levers 21 extend in the form of respective rigid arms 27, at the ends of which there are provided appendices 28 orthogonal thereto.

Said appendices are hollow at 29 and through them there pass the wires 12 which slide in contact with the arms 27 along their adjacent walls.

FIGS. 3, 4 (in dashed lines) and 5 also show a stator 30 of traditional type, of which the laminations assume two opposing dovetail configurations 31 which define the slots 32 in which the windings 33 are disposed.

In known manner, on the front and rear face of the stator there are applied plastics sections 34 which reproduce its surface, to project from the dovetails 31 where they comprise a tooth 25 intended to form the frontal retainer for the winding 33.

The operation of this device is as follows.

Figure 5:
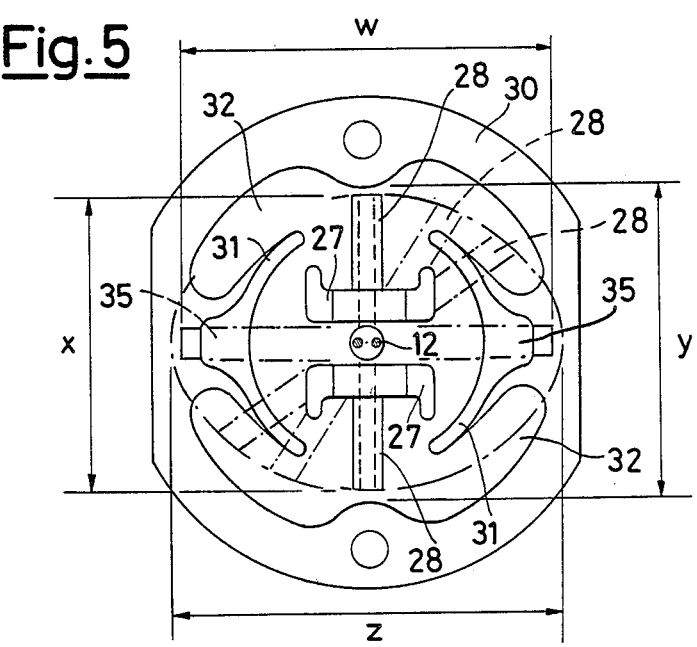
FIG. 5 is a view of FIG. 3 in the direction of the arrow F., with the stator rotated through 90°.

In order to form the two windings in the slots 32 of the stator 30, the assembly formed by the two concentric tubes 11 and 13 is made to traverse the inside of the stator 30, which is suitably fixed. During this translational movement of the tubes 11 and 13 the arms 27 are kept in their parallel position of mutual approach at a distance no greater than x between the ends of the points 28, as shown in FIG. 1 and by dashed lines in FIG. 3, such that they are able to easily penetrate into the stator along the major-diameter section of its cavity, ie of diameter y (as shown in FIG. 5). This is done by locating the balls 23 of the pins 22 diametrically opposite inside those portions of the groove 24 in which they are at their maximum distance apart (see FIG. 5). Consequently, the levers 21 are rotated on the pivots 2 such that the arms 27 approach each other to the maximum extent.

This position is therefore attained by combining maximum translation of the tube 11 with an appropriate angular orientation of the outer tube 13. At this point the outer tube 13 rotates with consequent sliding of the balls 23 in the groove 24 until the position which is 180° opposite that of FIG. 4 is attained.

During this rotation, because of the fact that the groove 24 extends elliptically the balls 23 firstly approach the axis of translation and then withdraw to return to their original maximum distance apart. The result is that the levers 21 rotate about the pivots 20 so that the arms 27 diverge to their maximum divergence in which the ends of the points 28 are at a distance z apart as shown in FIG. 3, with the intermediate stages being shown by dashed lines in FIG. 5, the arms then re-approaching each other to return to the position of parallelism shown in FIG. 1 and by dashed lines in FIG. 3. This enables the points 28, when in their position of maximum divergence z, to pass over the teeth 35 against which the windings 33 abut, and of which the ends are at a distance w apart where $w<z$, to thus deposit beyond the teeth 35 the wire 12 which in the meantime continues to be fed by the needles.

When the needles 27 have returned to the position shown in FIG. 5, the assembly again undergoes translational movement rearwards external to the stator where it makes a new rotation of the type described heretofore, to deposit the wire in the relative external seats, again by passing over the teeth 35. After this, it again traverses the inside of the stator to repeat the cycle. In this manner the arms 27 assume a parallel position of mutual approach during their sliding along and within the stator 30, of the arms 27 alternating with a state of divergence and subsequent reapproach when their ends 28 are external to the stator, so as to enable the wire which winds into the slots to easily pass over the teeth 35 without the aid of lead-ins or guides of any kind.

Thus by using this method, both windings are simultaneously made in the two opposing stator slots.

I claim:

1. A method for forming windings on electric motor stators comprising positioning a stator, traversing the inside of the stator in one direction with a needle having two pivotable arms with an orthogonal point on the end of each arm in a closed position and between which wire runs to create the winding on the stator, opening the arms and separating the points once the points have moved beyond one end of the stator by rotating the needle arms about a common axis to bring the wire into contact with the stator, closing the arms and points by rotation of said arms about a common axis, traversing the interior of the stator in the opposite direction with the needle arms and points in a closed position, opening the arms and separating the points once the points have moved beyond the other end of the stator by rotating the needle arms about the common axis to bring the wire into contact with the stator, closing the arms and points by rotation of said arms about a common axis and repeating the cycle until the stator is completely wound.

2. A machine for forming windings on an electric motor stator having front and rear faces, a stator axis extending between said faces, an internal cavity surrounding said stator axis and retention teeth projecting away from said stator axis along said front and rear faces, the machine comprising:
(a) a needle having a needle axis and a pair of points movable towards and away from one another in directions orthogonal to said needle axis;
(b) means for feeding wire through said points;
(c) means for positioning said needle relative to said stator so that said needle axis is substantially aligned with said stator axis;
(d) means for reciprocating the needle along said needle axis so that said points move through the internal cavity of the stator and move axially beyond said front and rear faces of the stator;
(e) means for rotating said needle about said needle axis through a predetermined arc in one direction while said points are beyond said front face and rotating said needle through said arc in the opposite direction while said points are beyond the rear face of the stator on each reciprocation of said needle; and
(f) means responsive to rotation of said needle about said needle axis for moving said points away from one another to a divergence position wherein said points project away from said stator axis beyond said retention teeth and then moving said points back towards one another to a convergence position wherein the distance between said points is less than the maximum internal dimension of said internal cavity of the stator during each rotation of the needle through said arc and maintaining said points in said convergence position as said points move through the internal cavity of the stator.

3. A machine as claimed in claim 2 wherein said needle has proximal and distal ends, and wherein said needle includes a fork member adjacent said proximal end, a pair of arms pivotably connected to said fork member for pivoting movement relative to said fork member about respective pivot axes parallel to one another but orthogonal to said needle axis, said arms having distal ends adjacent the distal end of the needle, each of said arms defining one of said points at the distal end of the arm, said means for rotating the needle about said needle axis including means for rotating said fork member about said needle axis.

4. A machine as claimed in claim 3 wherein said means for moving said points towards and away from one another includes a cam engaged with said arms and means for retaining said cam against rotation about said needle axis upon rotation of said fork member about said needle axis, said means for reciprocating said needle along said needle axis including means for reciprocating said fork member and said cam along said needle axis.

5. A machine as claimed in claim 4 further comprising an elongated hollow outer tube member having an axis coincident with said needle axis and an inner member received within said outer tube member, said inner and outer members being secured against axial movement relative to one another but rotatable relative to one another about said needle axis, said fork member being connected to one of said outer and inner members, said cam being connected to the other one of said outer and inner members.

6. A machine as claimed in claim 4 wherein said cam is disposed proximally of said pivot axes and wherein each of said arms has a cam follower projecting in the proximal direction and engaged with said cam.

7. A machine as claimed in claim 6 wherein said cam has a face facing in the distal direction, towards said pivot axes and a generally elliptical slot in said face, said cam followers being engaged in said elliptical slot.

8. A machine as claimed in claim 3 wherein said needle is supported only adjacent its proximal end.

9. A machine as claimed in claim 2 wherein said needle has proximal and distal ends, said points being disposed adjacent the distal end of said needle, said needle being supported only adjacent its proximal end.

10. A method of forming windings on an electric motor stator having front and rear faces, a stator axis extending between said faces, an internal cavity surrounding said stator axis and retention teeth projecting away from said stator axis along said front and rear faces, the method comprising the steps of:

(a) reciprocating a needle having a pair of points along the stator axis so that the needle points move through the internal cavity of the stator and move beyond the front and rear faces of the stator;

(b) rotating the needle about the stator axis through a predetermined arc in one direction while the points are beyond said front face and through the same arc in the opposite direction while the points are beyond the rear face;

(c) moving the points away from one another to a divergence position wherein the points project away from the stator axis beyond the retention teeth and then moving the points back towards one another towards a convergence position wherein the distance between the points is less than the maximum internal dimension of the cavity of the stator during each rotation of the needle and maintaining the points in the convergence position as the points pass through the internal cavity of the stator, said moving of the points away from one another and then back towards one another occurring in response to said rotating of the needle about the stator axis; and (d) dispensing wire from the points, whereby the wire will be wound onto the stator and engaged with the retention teeth by movement of the points.

* * * * *

UNITED STATES PATENT AND TRADEMARK OFFICE
CERTIFICATE OF CORRECTION

PATENT NO. : 4,762,283

DATED : August 9, 1988

INVENTOR(S) : Sabatino Luciani

It is certified that error appears in the above-identified patent and that said Letters Patent is hereby corrected as shown below:

Title page, item [75]: Change "Luciani Sabatino" to --Sabatino Luciani-- (the inventor's correct last name is Luciani).

Item [19], "Sabatino" should read --Luciani--.

Column 2, line 22: Change "width of" to --width y of--.

Column 2, line 66: Change "provided" to --pivoted--.

Column 3, line 24: Change "25" to --35--.

Signed and Sealed this

Twenty-first Day of August, 1990

Attest:

HARRY F. MANBECK, JR.

*Attesting Officer*   *Commissioner of Patents and Trademarks*